United States Patent [19]

Koistinen

[11] 4,418,496
[45] Dec. 6, 1983

[54] SUPPORT STRUCTURE FOR SMALL FLORAL ARRANGEMENT

[75] Inventor: Arnold A. Koistinen, Watertown, S. Dak.

[73] Assignee: Dakota Plastics Company, Watertown, S. Dak.

[21] Appl. No.: 411,863

[22] Filed: Aug. 25, 1982

[51] Int. Cl.³ .............................................. A01G 5/00
[52] U.S. Cl. .................... 47/41.12; D6/137; 248/215
[58] Field of Search ......................... 47/41–41.12, 47/39, 67, 70; 211/71, 69.8, 72; 248/205.1, 215, 27.8; D6/137

[56] References Cited

U.S. PATENT DOCUMENTS

| D. 211,890 | 8/1968 | Dixon | 47/67 X |
| 1,418,801 | 6/1922 | James | 248/215 |
| 1,566,982 | 12/1925 | Shee | 47/67 X |
| 2,225,681 | 12/1940 | Braun | 248/206 |
| 2,278,773 | 4/1942 | Erdmann | 47/41.12 |
| 2,576,705 | 11/1951 | Spitz | 47/41 X |
| 2,734,639 | 2/1956 | Green | 248/215.6 |
| 2,765,585 | 10/1956 | Smithers | 47/41.12 |
| 2,823,004 | 2/1958 | Melloh | D6/137 |
| 3,021,581 | 2/1962 | Cook et al. | 24/259 R |
| 3,027,014 | 3/1962 | Lindblom | 47/41 R |
| 3,039,647 | 6/1962 | Rusmussen | 24/259 R |
| 3,148,480 | 9/1964 | Gallo | 47/41.12 |
| 3,511,461 | 5/1970 | Clark | 248/27.8 |

FOREIGN PATENT DOCUMENTS 1424244  11/1965  France ...................................... 47/67

Primary Examiner—James R. Feyrer
Attorney, Agent, or Firm—Harvey B. Jacobson

[57] ABSTRACT

A support structure for small floral arrangements for use during occasions such as weddings and the like, the support structure including a multipurpose hanger for supporting ribbon bows, flowers and greens from the end of a church pew or bench along the aisle to provide an attractive display of decorative items in position for easy observation by those attending the occasion. The hanger includes a clip portion engaging the top edge portion of the pew and a vertical leg portion having structural features which facilitate the optional support of a ribbon bow, a water pick, or a water-soaked floral foam block in a secure and stable manner.

10 Claims, 7 Drawing Figures

U.S. Patent  Dec. 6, 1983  Sheet 1 of 2  4,418,496
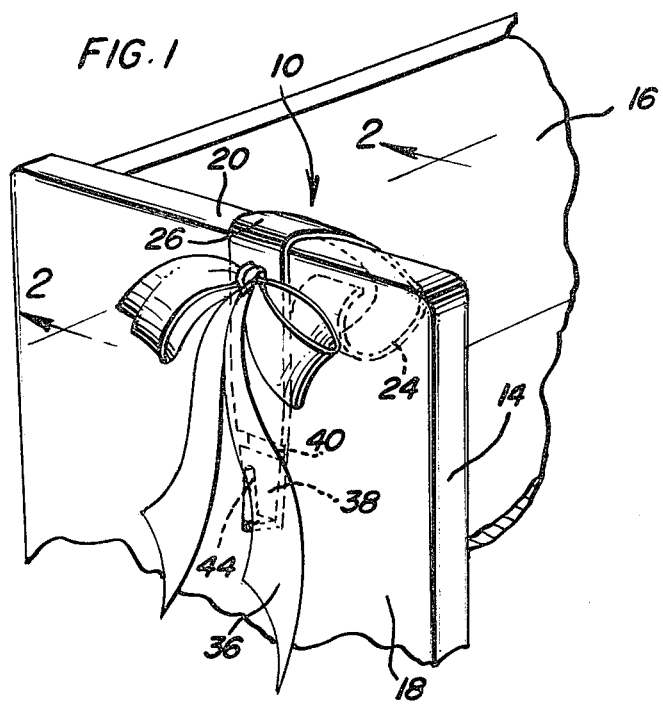
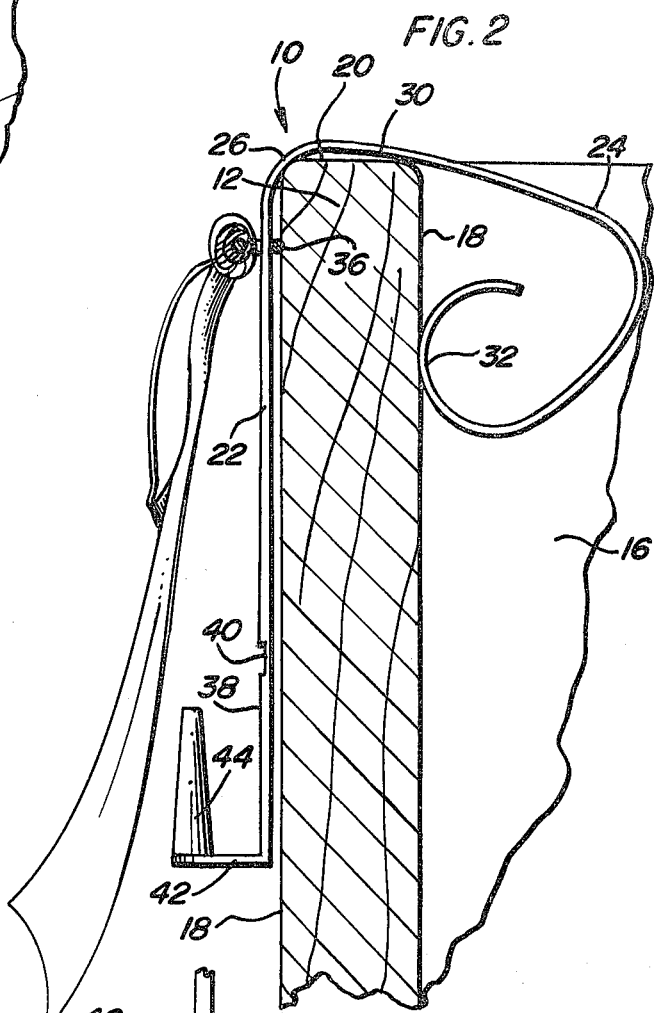
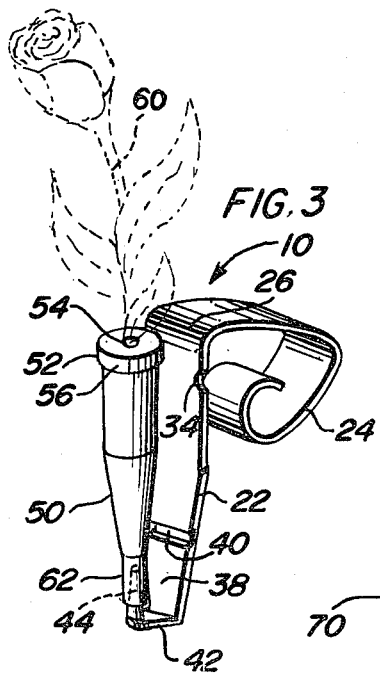
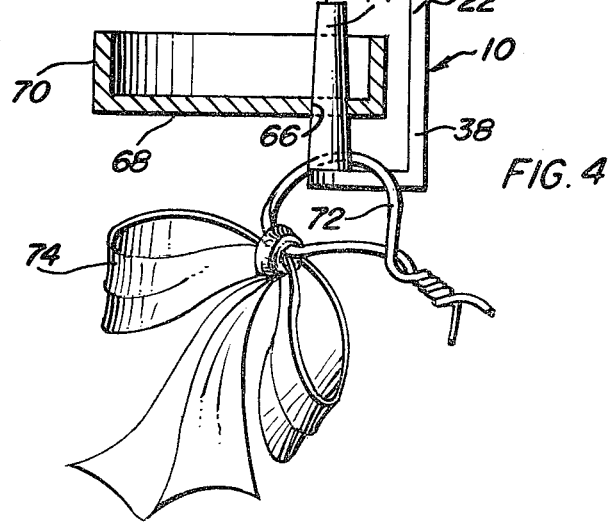

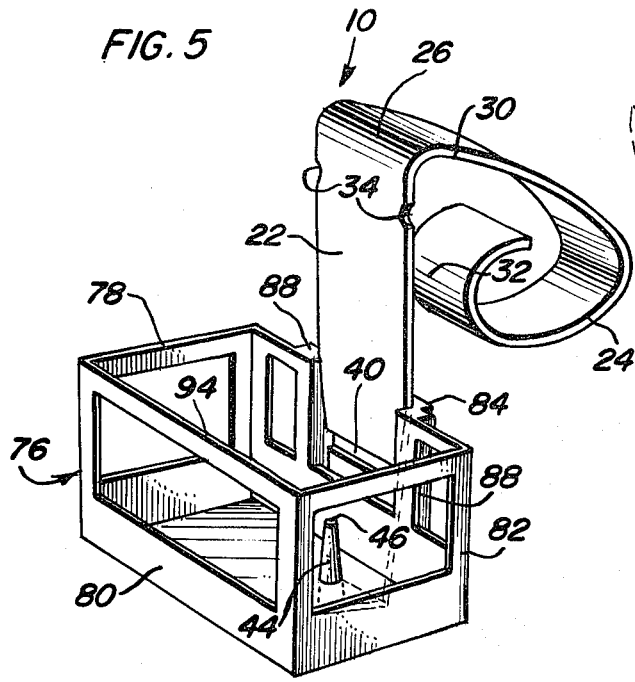
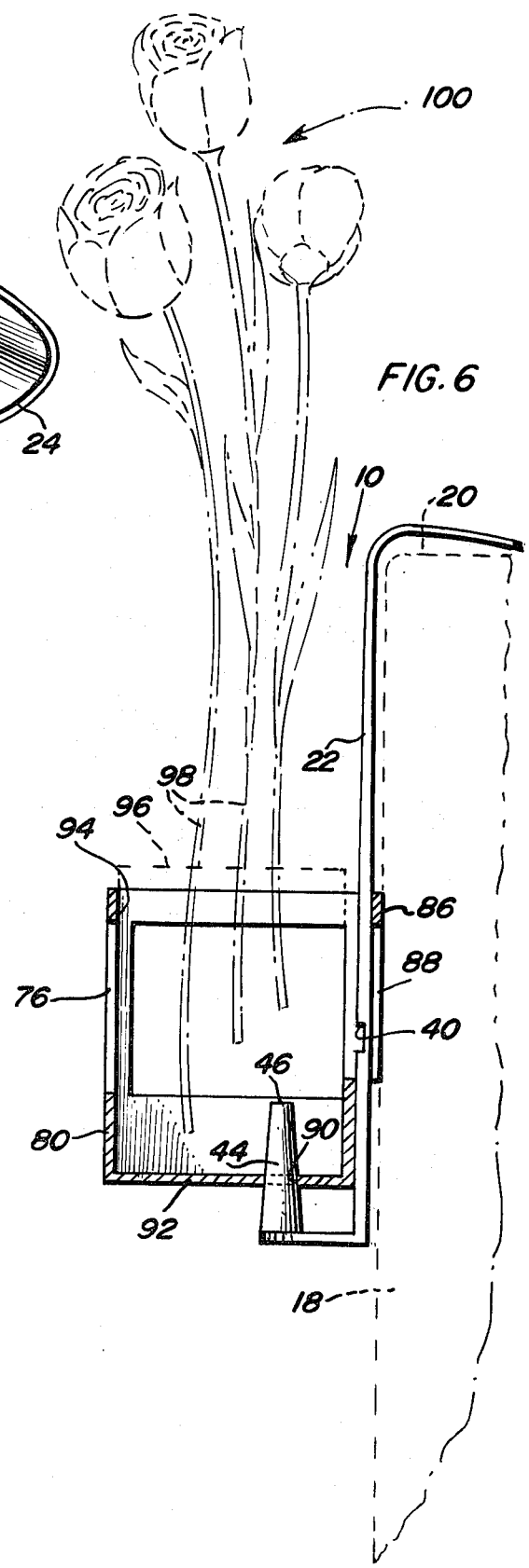
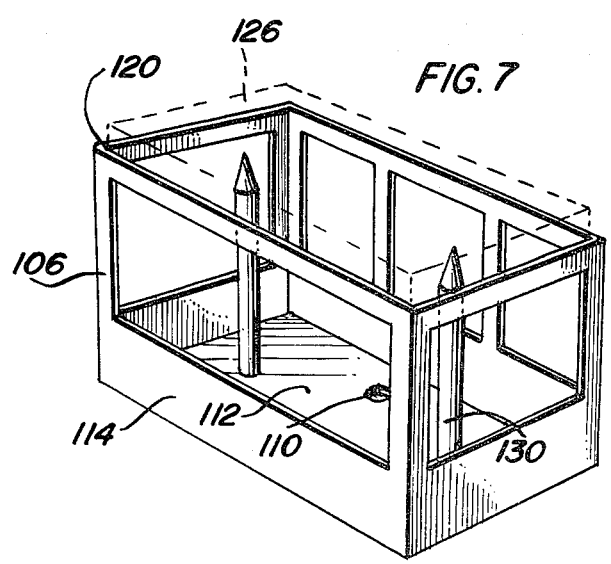

SUPPORT STRUCTURE FOR SMALL FLORAL ARRANGEMENT

BACKGROUND OF THE INVENTION

1. Field of the Invention

The present invention relates to a support structure useful particularly by florist and others for preparation and hanging small floral arrangements on ends of church pews by the aisle for occasions such as weddings and other festive occasions, although its use is not limited to these type of occasions.

Particularly, the invention is directed to a flower hanger that has a clip portion which will expand to accommodate a wide range of thicknesses of pews and yet provide adequate tension engaging the pew. As the clip is expanded to hook over greater thicknesses, a coil section of the clip is always in contact with a portion of the pew and maintains tension at right angles to the surface of the pew and the opposing portion comprised of the hanger strap provides better grip of the pew. The coiled portion thus prevents a gap that would otherwise allow the hanger to tip or slide forward or sideways when holding a flower arrangement.

Further, the invention is particularly directed to a pew hanger for small floral arrangements and in which an extension of the opposing hanger strap is provided with a water pick added for support of flowers and green floral elements supported from a tapered peg attached to a projecting lip at the bottom of the hanger. The peg is useful in conjunction with providing means for holding an extension water pick filled with flowers or greens forming a small floral arrangement in an upright position, and in which the tapered peg is inserted into the tube at the bottom end of the extension water pick provided with sufficient friction holding them together. Thus, there is a small leakproof container integral with the pew hanger to hang floral arrangements in an upright position, and in which it may also be used as part of a fastening structure for a floral foam block holder in a basket supported by the hanger which is a further feature of the invention. This further feature of the invention provides for a bottom pan and harness arrangement for holding a water-soaked foam block as well as allowing the structure of the pan to catch excess water that drips from the water-soaked block. The harness may be an integrally constructed cage-like construction for holding a small block of water absorbing floral foam and provide a larger floral arrangement or spray than possible with a water pick described above, and in which the harness is designed to be attached to the hanger by putting one section of the harness and pin arrangement around a lower part of the hanger and then inserting the peg in a hole in the pan for holding the pan and harness in stable securement. The peg is tapered and its contour not only holds the basket formed by the harness and the pan in a fixed position, but seals the hole so no water leaks out. By having the hole in the pan of smaller diameter than the base of the peg, the peg keeps the pan spaced above the lip of the hanger and provides a hook so a florist can wire or otherwise secure a ribbon bow or other decorative elements. A further feature of the basket is that a section extends between the strap of the hanger and the pew supporting the hanger and thus prevents the weight of the arrangement from tipping it away from the hanger. The basket also is provided with an inset, recess or jog formed in that part of the section fitting with the hanger and which maintains the harness with the floral arrangement from tipping sideways from the hanger strap, and this is further facilitated by a set of parallel ribs on each side of the vertical hanger extending between the harness and the pan. Spikes or projections extend upwardly from the pan surface for insertion into the floral foam block to hold the block securely in place in another embodiment of the invention. The assembly including the manufacturing of baskets may be done by injection molding and in which the spikes or projections serve in the ejection of the basket from off the force or male side of the cavity set in the mold by having ejector pins push on the ends of the spikes. Thus, the ejector pins will not have to extend beyond the force of the basket upon ejection which prevents the completed basket cages catching on protruding pins when the completed structure drops out of the mold.

The invention is directed to providing a crosswise groove in the hanger structure so positioned that a lowered end of the hanger strap supporting the projection can be severed with a knife or scissors when it is desired to use the hanger without the peg and in which the hanger arrangement is to be used merely as a structure for support of ribbon bows adequately held in stable securement on the hanger, and in which the groove or scored portion transversely of a lower intermediate portion of the hanger strap serves as a guide for cutting or severing the peg and terminal portion of the hanger strap, the scored portion providing ease of this step in cutting or severance. The hanger strap is provided at an intermediate upper portion with at least one edge notch that allows for a florist to attach a ribbon bow onto the hanger with wire or other fastener around the hanger strap which provides for keeping the bow in place.

DESCRIPTION OF THE PRIOR ART

Various floral display supports and floral hangers are known and the following U.S. Pat. Nos. are exemplary of the prior art:

1,418,801: J. C. James.
2,225,681: F. C. Braun.
2,576,705: M. L. Spitz.
3,027,014: E. M. Lindblom.
3,511,461: H. W. Clark.

The patent to Lindblom discloses a shaped clip with two bends and a tray-type projecting member for a display element received within an aperture. The patent to Clark discloses a support structure having two bends hung on a member and having hanger means for a wreath. The other patents are of more general interest and none of the patents discloses in combination all of the specific details of the present invention in such a way as to bear upon the patentability of any claims of the present invention.

SUMMARY OF THE INVENTION

An object and advantage of the present invention is to provide a multipurpose pew hanger as a support structure for small floral arrangements for use during various occasions, such as during weddings, although its use is not limited to these occasions.

Another object and advantage of the present invention is to provide a support structure for small floral arrangements supported on ends of pews, benches or other seating structures, and wherein the support structure is adapted for resting upon a horizontal surface and being constructed and arranged as an angulated means forming at an intermediate portion of the elongated angulated means a first portion on one side of the angulated means and forming a second portion on the other side of the angulated means, the first portion of the angulated means being generally flat throughout for engaging a vertical side proximate the horizontal surface and the second portion being coiled for engagingly impacting and grasping the other vertical side, and thus retain the support structure in securement therewith. At a free or terminal area of the first portion, projections or structures are provided for support of a water pick for flowers and/or greens, to engage with a wire or support recess for holding a ribbon bow and the like in place, and to provide a harness and bottom pan supporting a water soaked floral foam block for catching excess water dripping from the block and holding by means of a harness structure the floral foam block from tipping and breaking apart. The harness may be in the form of a cage structure integral with a pan for supporting the foam block.

A further object and advantage of the present invention is to provide a support structure for small floral arrangements and in which the support structure contains a peg mounted proximate an end of the flat first portion, the peg being adapted to support a water container for such small floral arrangements. Also, the invention is provided with fastener means mounted proximate the end of the first portion for fastening a decorative member thereto, and the first portion may also contain a grooved or scored portion adaptable for cutting off the terminal section of the first portion. A free end of the first portion contains a fastener member for engaging with a box for supporting a water-soaked floral foam block that itself supports a floral spray or an arrangement of flowers. Within the box there is a pan catching excess water from the water-soaked block, and the box is constructed and arranged for ready engagement and disengagement from the first portion. The second portion of the support structure is provided with a coiled portion engagingly impacting with one of the vertical sides of the end of the pew while a midportion thereof is adapted for engaging the horizontal surface thereof, and the coil portion readily provides for grasping the end of the pew and holding the supporting structure in stable securement with the end of the pew.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the support structure mounted on an end of a bench or pew according to the present invention.

FIG. 2 is a sectional view taken along lines 2—2 of FIG. 1.

FIG. 3 is a perspective view of the support structure including a water pick or container for flowers and the like.

FIG. 4 is a fragmentary view of the projection or holding structure at the free end of the support structure.

FIG. 5 is a perspective view of the support holder in combination with a cage or box containing a pan mounted on the projection of the support structure.

FIG. 6 is a fragmentary and enlarged side sectional view of the support structure of FIG. 5.

FIG. 7 is a perspective view of details of another embodiment of the box or cage structure including a harness and bottom pan arrangement.

DESCRIPTION OF THE PREFERRED EMBODIMENTS

Referring now to the drawings, there is shown a pew hanger and support structure 10 shown installed or mounted on a vertical end member 14 of a bench or pew 16. The end member 12 has two opposite vertical sides 18 in general parallel relation to each other and connected by at least one transversely disposed horizontal top surface 20. The support structure 10 is comprised of an elongated flat sheet or leg member 22 and a coiled sheet member 24 connected at an integral curved portion 26 to form an integrally and uniformly constructed body element. The support structure may be of any resilient plastic or metal material of the configuration, dimensions and orientation, as shown in FIG. 2, and it is generally constructed and arranged such that the flat or leg member 22 engages flat against the outer vertical surface of the end member 14. A generally straight inclined portion 30 of the coiled sheet member 24 spaced from connecting portion 26 extends downward and outward from the upper end of leg member 22 and connecting portion 26 and engages and rests upon a portion of the horizontal surface 20 while the coiled member 24 at the end of portion 30 remote from portion 26 is of a general spiral configuration and sufficiently coiled inwardly so that a portion 32 of the coiled member 24 engagingly impacts and contacts the adjacent vertical side 18 of end member 14 at a point spaced below and inwardly of the outer end of portion 30 in opposed relation to leg member 22. The tension of the coiled member 24 is constructed and arranged so that bias or clamping force is exerted onto the end member 14 of pew 16 whether the thicknesses between the vertical sides 18 is a large or generally small dimension, such dimension usually not varying in order of magnitude more or less than about an inch along the thickness dimension. Of course, the amount of turn of the coiled member 24 may be more than or less than 360° with the portion 32 being substantially below the top surface 20 of end member 14 and also inwardly of and below the outer end of portion 30. It is seen, however, that the support structure 10 comprised of flat leg member 22, coiled member 24, portion 30 and curved connecting portion 26 intermediate the member 22 and portion 30 provides for a mounting structure in the form of a stable pew hanger that effectively grasps end member 14 of the pew 16 so that the support structure 10 is stably and securely held in fixed relation with respect to the pew 16.

At an upper intermediate portion of the flat member 22 is a set of at least two opposite side recesses or notches 34 receiving a short length of floral wire 36 used to support and hold a ribbon bow secure to the support structure 10 by twisting to provide a decorative appearance to the end member 14 of pew 16.

A lower intermediate portion of the member 22 includes a transverse scored recess or groove 40 useful in facilitating shearing or clipping off the free or lower end of the flat member 22. The lower end of member 22 of the support structure 10 includes a laterally outwardly extending integral lip 42 extending from the member 22 and having a projection or tapered peg 44 extending upwardly therefrom having a generally truncated conic configuration terminating at a free end 46.

A container or water pick with tubular extension 50 that is capable of supporting flowers, greens or other decorative items as well as contain fluid therein, as disclosed in my U.S. Pat. No. 3,177,617, issued Apr. 13, 1965, is mounted on the peg 44. The container 50 is open at the top 52 having an opening 54 in a cap 56 that is removable from the container 50. In the container 50 and passing through the opening 54, are flowers or green stems 60 extending upwardly and having the stems thereof immersed in water (not shown) held within the container 50. At a bottom 62 of the container 50, there is an axial socket of a diameter such that it frictionally engages with the conic surface of the peg 44 to hold the container in place.

In another use of the invention, see FIG. 4, the support structure 10 is used to support a pan 68 provided with upstanding sidewalls 70 and an opening 66 in the bottom thereof which receives tapered peg 44 as illustrated in FIG. 4. The pan receives a block of floral foam which supports flower stems or the like and is saturated with water. Any excess water will be retained by the tray 68. The peg 44 has a size to close opening 66 and the relation of the diameter of opening 66 and peg 44 is such that the tray is positioned above the lip 42 so that a ribbon bow 74 can be attached by wire 72.

In the embodiment of FIGS. 5 and 6, the support structure 10 supports a box structure or cage 76 containing a harness or holding members 78 extending laterally and above a pan 80 which may be the same as pan 68 in FIG. 4. The holding members 78 are connected to the pan 80 by vertical members forming corners 82 of the cage, and the cage 76 has an offset portion 84 that extends rearwardly of the flat leg member 22 and includes a back member 86 and offset connecting members 88 integral with the cage 76 and the back member 86. The bottom 92 of the pan 80 has an opening 90 therein dimensioned to frictionally engage the peg 44 attaining water tight or fluid tight integrity so that any fluid in the pan 80 is contained without escapement through the opening 90. The arrangement of the peg 44 in opening 90 of the pan together with the offset back 86 and connectors 88 as described above provide for stably maintaining the cage 76 on the support structure 10. The cage 76 is oriented and has an open top or access 94 so that a water-soaked floral foam block 96 positioned within the cage 76 is securely held therein. The block 96 retains an adequate amount of water to supply moisture to the stems 98 of flowers 100 which are inserted into the block 96 maintain the appearance characteristics of the flowers for a long period of time.

FIG. 7 illustrates another form of cage 106 in which the bottom 112 of the pan 114 has an opening 110 and the upper end is open at 120 to receive a water-soaked floral foam block 126 similar to that described above. The cage 106 is provided with a set of two pointed projecting elements or pegs 130 which penetrate into the block 126 to hold the floral foam block in the cage.

The cage 106 of the invention may be manufactured by injection molding and the spikes or projections 130 serve in the process of ejection of the cage 106 from the force on male side of the cavity set in the mold since the ejector pins push on the ends of the projections 130. Thus, the ejector pins will not have to extend beyond the force for the cage upon ejection which prevents the problem of having the cages catching on protruding ejector pins when they drop out of the mold cavity.

The scored recess 40 described above is generally crosswise of the flat sheet member 22 and when a knife or scissors is used to cut the material along the scored recess 40, the peg 44, lip 42 and that part of the flat member 22 up to the scored recess 40 is removed by action of the knife or scissors along the scored recess 40. The groove 40 not only serves as a guide for cutting but also provides a thin section where it is easier to cut to facilitate removal of the distal or free end of flat member 22. The pair of notches 34 referred to are on each edge of the flat sheet member 22 as shown and a florist can attach the ribbon bow for hanging from the support structure 10 in a decorative fashion about the upper portion thereof by use of a wire extending transversely about each side of the flat member 22 and engaging each of the notches 34 so that these notches retain the bow in place.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. Support structure for small floral arrangements for use during occasions such as weddings and the like, the support structure comprising grasping means for mounting upon a member having two vertical sides and a horizontal surface transversely of the two vertical sides, the grasping means adapted for resting upon the horizontal surface and to biasingly engage each of the two vertical sides, the grasping means including an elongated sheet of resilient material embodying a generally straight elongated and inclined intermediate portion, a vertical depending first portion extending downwardly from the upper end of said inclined portion, a second portion on the lower end of said inclined portion and joined thereto by an arcuate integral connecting portion, the first vertical depending portion being generally flat throughout its vertical extent for engagement of one side thereof with one of said vertical sides, the intermediate portion forming an included angle of less than 90° with said one side of said first portion and extending a greater distance in a horizontal direction from the upper end of said vertical depending portion than in a vertical direction from the upper end of said vertical depending portion, said second portion extending downwardly from and inwardly toward said one side of said vertical depending first portion and terminating downwardly in an inwardly and upwardly curving coiled portion for frictional engagement with the other of said vertical sides at a point a spaced distance below the level of the lower end of said inclined intermediate portion, displacement of said coiled portion away from said one side of said depending first portion resulting in an increase of the radius of curvature of said arctuate integral connecting portion and an increase in the included angle between said depending first portion and said intermediate portion, whereby more than minimal spacing changes between said coiled portion and said one side of said vertical depending first portion may be accommodated.

2. The invention of claim 1 wherein the lower end of said first portion includes an outstanding lip supporting upstanding peg means for supporting a water container for small floral arrangements.

3. The invention of claim 1 wherein fastener means is mounted proximate the upper end of the first portion for fastening a decorative member thereto.

4. The invention of claim 1 wherein groove means is disposed transversely a lower end portion of the first portion for forming a scored cutoff indicia of a terminal residual section of the first portion.

5. The invention of claim 1 wherein the upper end portion of said first portion includes a transverse arranged notch adapted to receive a strand for supporting a decorative member.

6. The invention of claim 1 wherein the lower end portion of the first portion includes a fastener member, and a box means engagingly supported by an intermediate surface of the first portion and the fastener member, and floral foam block means retained in the box means.

7. The invention of claim 6 wherein the box means includes a pan for catching and retaining excess water that may drip from water-soaked foam block means.

8. The invention of claim 6 wherein the box means includes a mating structure for engagement with said first portion, and with the fastener member, to maintain the box means from tipping.

9. The invention as defined in claim 6 wherein said fastener member includes a laterally extending support lip positioned below the upper end of the outer leg, a tapered peg extending upwardly from said lip in spaced relation to said first portion, a tray means haing a bottom and an upstanding peripheral wall, said foam block being removably supported in said tray means and receiving any water associated therewith, the bottom of said tray means including an opening receiving the tapered peg for supporting the tray means with the peg forming a watertight closure for said opening.

10. The invention as defined in claim 9 wherein said tray means includes a foam block retaining cage extending upwardly from the peripheral wall and upstanding pointed pegs on said bottom for impaling the floral foam block to retain the block in stable position in the tray means and cage.

* * * * *